US006294500B1

(12) United States Patent
Debras et al.

(10) Patent No.: US 6,294,500 B1
(45) Date of Patent: Sep. 25, 2001

(54) PRODUCTION OF POLYETHYLENE HAVING A BIMODAL MOLECULAR WEIGHT DISTRIBUTION

(75) Inventors: Guy Debras, Frasnes-lez-Gosselies; Jean-Pierre Dath, Beloeil, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/432,187

(22) Filed: Nov. 2, 1999

Related U.S. Application Data

(62) Division of application No. 08/996,256, filed on Dec. 22, 1997, now Pat. No. 6,015,866.

(30) Foreign Application Priority Data

Dec. 20, 1996 (EP) .................................................. 96120696

(51) Int. Cl.$^7$ ............................. B01J 23/26; B01J 27/06; B01J 27/132; B01J 27/135
(52) U.S. Cl. .......................... 502/228; 502/224; 502/227; 502/231; 502/240; 502/305; 502/309; 502/319; 502/320
(58) Field of Search .................................... 502/224, 227, 502/228, 231, 240, 305, 309, 319, 320

(56) References Cited

U.S. PATENT DOCUMENTS

| 4,011,382 | 3/1977 | Levine et al. . |
| 4,025,707 | * 5/1977 | Hogan .................................. 526/105 |
| 4,130,505 | * 12/1978 | Nasser, Jr. et al. .................... 502/203 |
| 4,981,927 | 1/1991 | Rekers et al. . |
| 5,034,364 | 7/1991 | Kral et al. . |
| 5,081,089 | 1/1992 | Rekers et al. . |
| 5,219,962 | 6/1993 | McDaniel et al. . |
| 5,221,720 | * 6/1993 | McDaniel et al. .................... 526/135 |
| 5,310,834 | 5/1994 | Katzen et al. . |
| 5,364,915 | 11/1994 | Benham et al. . |
| 5,486,584 | 1/1996 | Badley et al. . |
| 5,595,953 | 1/1997 | McDaniel et al. . |

FOREIGN PATENT DOCUMENTS

| 0291824 | * 11/1988 | (EP) . |
| 0480376 | * 4/1992 | (EP) . |
| 0591968 | * 4/1994 | (EP) . |

\* cited by examiner

Primary Examiner—Elizabeth D. Wood
(74) Attorney, Agent, or Firm—Jim D. Wheelington

(57) ABSTRACT

A process for producing high density polyethylene, the process comprising polymerising ethylene, or copolymerising ethylene and an alpha-olefinic comonomer comprising from 3 to 10 carbon atoms, in the presence of a catalyst system comprising first and second chromium-based catalysts, the first chromium-based catalyst having been reduced and reoxidised and the second chromium-based catalysts having been activated, fluoridised before or during the activation step, and reduced, the first and second chromium-based catalysts having a pore volume difference of at least 0.8 cc/g. There is further provided a catalyst system for the production of high density polyethylene by polymerising ethylene or copolymerising ethylene and an alpha-olefinic comonomer comprising from 3 to 10 carbon atoms, the catalyst system comprising first and second chromium-based catalysts, the first chromium-based catalyst having been reduced and reoxidised and the second chromium-based catalyst been activated, fluoridised before or after the activation step, and reduced, and the first and second chromium-based catalysts having a pore volume difference of at least 0.8 cc/g. There is further provided the use of the catalyst system for increasing the biomodality of the molecular weight distribution of a high density polyethylene.

6 Claims, 6 Drawing Sheets

PRODUCTION OF POLYETHYLENE HAVING A BIMODAL MOLECULAR WEIGHT DISTRIBUTION

This is a divisional of application Ser. No. 08/996,256, filed Dec. 22, 1997, now U.S. Pat. No. 6,015,866.

The present invention relates to a process for the production of high density polyethylene (HDPE), in particular such a polyethylene having a bimodal molecular weight distribution. The present invention further relates to a catalyst system for producing such HDPE and to the use of such a system.

For polyethylene, and for high density polyethylene (HDPE) in particular, the molecular weight distribution (MWD) is a fundamental property which determines the properties of the polymer, and thus its applications. It is generally recognised in the art that the molecular weight distribution of a polyethylene resin can principally determine the physical, and in particular the mechanical, properties of the resin and that the provision of different molecular weight polyethylene molecules can significantly affect the rheological properties of the polyethylene as a whole.

Since an increase in the molecular weight normally improves the physical properties of polyethylene resins, there is a strong demand for polyethylene having high molecular weight. However, it is the high molecular weight molecules which render the polymers more difficult to process. On the other hand, a broadening in the molecular weight distribution tends to improve the flow of the polymer when it is being processed at high rates of shear. Accordingly, in applications requiring a rapid transformation employing quite high inflation of the material through a die, for example in blowing and extrusion techniques, the broadening of the molecular weight distribution permits an improvement in the processing of polyethylene at high molecular weight (this being equivalent to a low melt index, as is known in the art). It is known that when the polyethylene has a high molecular weight and also a wide molecular weight distribution, the processing of the polyethylene is made easier as a result of the low molecular weight portion and also the high molecular weight portion contributes to a good impact resistance for the polyethylene film. A polyethylene of this type may be processed utilising less energy with higher processing yields.

The molecular weight distribution can be completely defined by means of a curve obtained by gel permeation chromatography. Generally, the molecular weight distribution is defined by a parameter, known as the dispersion index D, which is the ratio between the average molecular weight (Mw) and the average molecular weight by number (Mn). The dispersion index constitutes a measure of the width of the molecular weight distribution. For most applications, the dispersion index varies between 10 and 30.

It is known in the art that it is not possible to prepare a polyethylene having a broad molecular weight distribution and the required properties simply by mixing polyethylenes having different molecular weights.

As discussed above, high density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction. In a bimodal high density polyethylene, the mixture of the high and low melting weight fractions is adjusted as compared to a monomodal distribution so as to increase the proportion of high molecular weight species in the polymer. This can provide improved mechanical properties.

It is accordingly recognised in the art that it is desirable to have a bimodal distribution of molecular weight in the high density polyethylene. For a bimodal distribution a graph of the molecular weight distribution as determined for example by gel phase chromatography, may for example include in the curve a "shoulder" on the high molecular weight side of the peak of the molecular weight distribution.

The manufacture of bimodal polyethylene is known in the art. It is known in the art that in order to achieve a bimodal distribution, which reflects the production of two polymer fractions, having different molecular weights, two catalysts are required which provide two different catalytic properties and establish two different active sites. Those two sites in turn catalyse two reactions for the production of the two polymers to enable the bimodal distribution to be achieved. Currently, as has been known for many years, as exemplified by EP-A-0057420, the commercial production of bimodal high density polyethylene is carried out by a two step process, using two reactors in series. In the two step process, the process conditions and the catalyst can be optimised in order to provide a high efficiency and yield for each step in the overall process. However, the currently commercially employed two step processes suffer from the disadvantage that because two separate serial processes are employed, the overall process has a low throughput.

It would be desirable to provide a one step process for manufacturing bimodal high density polyethylene. EP-A-480376 discloses the production of bimodal polyethylene using a two catalyst mixture of a supported chromium catalyst and a Ziegler-Natta type catalyst. This process suffers from the disadvantage that the Ziegler-Natta catalyst requires a co-catalyst to give an active catalytic system but the co-catalyst can influence the supported chromium catalyst and in particular can detrimentally affect its activity. The applicant believes that the process disclosed in that prior patent specification has not been used commercially.

It is known in the art that the physical properties, in particular the mechanical properties, of a polyethylene product vary depending on what catalytic system was employed to make the polyethylene. This is because different catalyst systems tend to yield different molecular weight distributions in the polyethylene produced. Thus for example the properties of a polyethylen product produced using a chromium-based catalyst tend to be different from the properties of a product employed using a Ziegler-Natta catalyst. The production of HDPE using just a chromium-based catalyst is thus desirable to enable the particular polyethylene product to be manufactured. The Encyclopedia of Polymer Science and Engineering, Volume 6, pages 431–432 and 466–470 (John Wiley & Sons, Inc., 1986, ISBN 0-471-80050-3) and Ullmann's Encyclopedia of Industrial Chemistry, Fifth Edition, Volume A21, pages 501–502 (VCH Verlagsgesellschaft mbH, 1992, ISBN 3-527-20121-1) each discuss Phillips and Ziegler-Natta catalysts and the production of HDPE.

The prior art relating to the use of chromium-based catalysts to polymerise HDPE can be classified into two broad groups, the first group teaching a catalyst system having two or more catalytic sites, at least one being a Cr site, on a single catalyst support and the second group teaching mixed catalysts, each on a respective support, the mixture comprising chromium-based catalysts, or one such chromium-based catalyst with a catalyst containing active sites of a non-Cr nature.

The first group includes as a representative prior publication U.S. Pat. No. 5,034,364. This document discloses two chromium species supported on a single refractory oxide. One species comprises $CrO_3$ or a Cr compound calcinable to $CrO_3$ and the other species comprises a silylchromate-type compound. Such a catalyst does not produce a bimodal HDPE.

The second group includes as representative prior publications EP-A-480376 discussed above, EP-A-291824, U.S. Pat. No. 4,025,707, U.S. Pat. No. 5,310,834 and EP-A-591968.

EP-A-291824 discloses the production of HDPE using a mixture of two chromium-containing catalyst components having silica supports of different pore volumes and one of the components also containing Al. U.S. Pat. No. 4,025,707 discloses a mixed catalyst comprising several portions of the same or different supported components and metal promoted variations thereof, each portion being activated at a different temperature. Each portion is post-treated with a hydrocarbyl aluminium hydrocarbyloxide. U.S. Pat. No. 5,310,834 discloses a mixed chromium catalyst comprising two supported Cr-containing catalyst components which additionally have one or more metallic or non-metallic catalytic agents, such as Al, Ti, Zr, B or P. The pore volume of the silica supports used for the first and second catalyst components differs by at least 0.3 cc/g. EP-A-591968 discloses the use of two different chromium-based catalyst systems. The supports of at least two of the systems have an average pore radius difference sufficient differentially to introduce a non-ethylene comonomer into the higher molecular weight portion of the resulting copolymer. A metal alkyl, such as triethyl boron, is introduced into the ethylene stream to assist generation of the comonomer. This process suffers from the disadvantage that in an industrial process, the production of a distribution of non-ethylene comonomers ($C_4$, $C_6$, $C_9$, etc.) can render recycling of the isobutane diluent used in the polymerisation process very difficult.

All of EP-A-291824, U.S. Pat. No. 4,025,707, U.S. Pat. No. 5,310,834 and EP-A-591968 disclose the manufacture of polyethylene having a broad molecular weight distribution but no document discloses the manufacture of bimodal polyolefins. There is a need in the art for a process for producing bimodal polyolefins, and in particular bimodal high density polyethylene, using a one step process and employing a chromium-based catalyst which does not encounter the problems of employing a Ziegler-Natta type catalyst as discussed hereinabove.

The present invention aims to provide a process for producing polyethylene having a bimodal molecular weight distribution which overcomes or at least mitigates some of the problems in the prior art discussed above.

Accordingly, the present invention provides a process for producing high density polyethylene, the process comprising polymerising ethylene, or copolymerising ethylene and an alpha-olefinic comonomer comprising from 3 to 10 carbon atoms, in the presence of a catalyst system comprising first and second chromium-based catalysts, the first chromium-based catalyst having been reduced and reoxidised and the second chromium-based catalyst having been activated, fluoridised before or during the activation step, and reduced, the first and second chromium-based catalysts having a pore volume difference of at least 0.8 cc/g.

The present invention further provides a catalyst system for the production of high density polyethylene by polymerising ethylene or copolymerising ethylene and an alpha-olefinic comonomer comprising from 3 to 10 carbon atoms, the catalyst system comprising first and second chromium-based catalysts, the first chromium-based catalyst having been reduced and reoxidised and the second chromium-based catalyst having been activated, fluoridised before or during the activation step, and reduced, and the first and second chromium-based catalysts having a pore volume difference of at least 0.8 cc/g.

The present invention is predicated on the surprising discovery by the present inventor that the use of a mixture of two different chromium-based catalysts which (a) have a minimum pore volume difference and (b) have been pre-treated differently can unexpectedly yield high density polyethylene having a bimodal molecular weight distribution in a one-step polymerisation process.

Particularly, the present inventor has discovered that the provision of a particular minimum pore volume difference between the first and second chromium-based catalysts can result in the first catalyst having relatively high volume porosity which catalyses the production of the low molecular weight, high melt index fraction of the high density polyethylene and the second catalyst having relatively low volume porosity which catalyses the production of the high molecular weight, low melt index fraction of the high density polyethylene. Such a difference between the high melt index and low melt index of the two fractions is, in accordance with the invention, enhanced by reducing and reoxidising the high volume porosity catalyst and fluoridising and reducing the low volume porosity catalyst. Such an enhancement of the melt index difference between the fractions can lead to a bimodal molecular weight distribution the high density polyethylene. It is believed, without being bound by theory, that the provision of a volume porosity difference between the two catalysts of at least 0.8 cc/g can yield a difference between the high and low melt indexes which difference is in turn enhanced by the reduction and reoxidation of the catalyst for producing the low molecular weight fraction which tends to boost the melt index of that fraction and the fluoridation and subsequent reduction of the high molecular weight fraction which tends to depress the melt index of that fraction. It is thus believed that the use of the reduction and reoxidation steps for the first chromium-based catalyst and the fluoridisation and reduction steps for the second chromium-based catalysts can tend to enhance the spread of the molecular weight distribution of the entire catalyst so as to yield a bimodal molecular weight distribution.

The first chromium based catalyst preferably comprises a silica and/or titania supported chromium oxide catalyst. A particularly preferred first chromium-based catalyst may comprise from 0.5 to 5 wt % chromium, preferably around 1 wt %, on a catalyst support. The weight percentage of chromium is based on the weight of the chromium-containing catalyst. The first chromium-based catalyst may have a specific surface area of from 200 to 700 $m^2/g$, preferably from 400 to 550 $m^2/g$ and a volume porosity of greater than 2 cc/g, preferably from 2 to 3 cc/g. The average pore radius is preferably greater than 100 A, more particularly from 100 to 1000 A, most preferably from 150 to 250 A.

A particularly preferred chromium-based catalyst for use in the present invention as the first catalyst comprises the catalyst sold in commerce by Grace GmbH, D-67545, Worms, Germany. According to the manufacturer's data sheets, this catalyst has an average pore radius of 190 A, a pore volume of around 2.1 cc/g and a chromium content of around 1 wt % based on the weight of the chromium-containing catalyst. The support comprises a composite silica and titania support. This particular catalyst is hereinafter referred to as "catalyst 1".

The first chromium-based catalyst is subjected to a reduction and reoxidation process in which at least a portion of the chromium is reduced to a low valance state and then at least a portion of the chromium is reoxidised to a higher valance state. Such a reduction and reoxidation process is known in the art. Preferably, the chromium-based catalyst is reduced in an atmosphere of dry carbon monoxide in known manner at a temperature of from 700 to 900° C., preferably at a temperature of around 860° C. The chromium-based catalyst is then reoxidised in air in known manner at a temperature of from 700 to 900° C., preferably at a temperature of around 760° C.

The first chromium-based catalyst acts to catalyse the polymerisation of the low melting weight part of the high density polyethylene. The second chromium-based catalyst catalyses the production of the high melting weight part of the high density polyethylene. The second chromium-based catalyst has been activated at a relatively low temperature, fluoridised before or after the activation step to increase the activity of the catalyst and then reduced.

The second chromium-based catalyst preferably comprises a silica-alumina supported chromium oxide catalyst. A particularly preferred second chromium-based catalyst may comprise from 0.5 to 5 wt % chromium, preferably around 1 wt % chromium, based on the weight of the chromium-containing catalyst, on a catalyst support of low pore volume silica-alumina. The second chromium-based catalyst may have a specific surface area of from 250 to 450 $m^2/g$, preferably from 300 to 400 $m^2/g$, and a volume porosity of no greater than 1.5 cc/g, preferably no greater than 1.3 cc/g, most preferably from 0.9 to 1.2 cc/g. The average pore radius is preferably no greater than 200 A, more preferably no greater than 150 A and preferably from 110 to 130 A.

In accordance with the invention, the first and second chromium-based catalysts have a pore volume difference of at least 0.8 cc/g. Currently commercially available chromium-based catalysts have a maximum pore volume of up to about 3 cc/g. Accordingly, in practice using currently commercially available catalysts, the pore volume difference can be up to about 2.1 cc/g.

The first and second chromium-based catalysts may have different average pore radii to enable the catalyst system as a whole to catalyse the production of both the high and low molecular weight fractions in the bimodal HDPE. Preferably, the first and second chromium-based catalysts have a difference in average pore radius of from 50 to 70 A.

A particularly preferred chromium-based catalyst for use in the present invention as the second catalyst comprises a fluorine-containing catalyst sold in commerce by Grace GmbH, D-67545, Worms, Germany. According to the manufacturer's data sheets, this catalyst has an average pore radius of around 120 A, a pore volume of around 1.1 cc/g and a chromium content of around 1 wt % based on the weight of the chromium-containing catalyst. The support is a silica-alumina support. This particular catalyst is hereinafter referred to as "catalyst 2".

The second chromium-based catalyst may either be a fluorine-containing catalyst which is commercially available, or may be a similar yet non-fluorine-containing catalyst, which is then subjected to a fluoridisation or fluorination step which is performed in known manner. For example, the chromium-based catalyst may be premixed with a fluorine-containing compound such an ammonium boron tetrafluoride ($NH_4BF_4$) in solid form and then heated at elevated temperature so as to react together the catalyst and the fluorine-containing compound. Such a fluorinisation step may be performed before or during the activation step.

The catalyst is activated in air at a relatively low activation temperature ranging from 450 to 750° C. More preferably, the activation is carried out at a temperature of from 500 to 650° C. A most preferred activation temperature is around 540° C.

Following the activation step, the second chromium-based catalyst is subjected to a chemical reduction step employing dry carbon monoxide. The reduction step is preferably carried out at a temperature of from 300 to 500° C. A most preferred reduction temperature is around 370° C.

The fluorination step for the second chromium-based catalyst may be carried out before or after the activation step.

The first and second chromium-based catalysts are combined together in a manner known in the art in order to form an intimate mixture of the solid catalysts. The first and second chromium-based catalysts are combined in a proportion which is dependent upon the relative activities of the two catalysts. In general, the catalyst for the high molecular weight fraction tends to have a lower activity than the catalyst for the low molecular weight fraction. Accordingly, in general the catalyst for the high molecular weight fraction is present in a greater quantity than that for the catalyst for the low molecular weight fraction. Preferably, the first and second catalysts are mixed in a proportion of from 10:90 to 90:10 by weight, the most preferred proportion being 20 wt % of the first catalyst and 80 wt % of the second catalyst.

In the preferred process of the present invention, the polymerisation or copolymerisation process is carried out in the liquid phase comprising ethylene, and where required an alpha-olefinic comonomer comprising from 3 to 10 carbon atoms, in an inert diluent. The comonomer may be selected from 1-butene, 1-pentene, 1-hexene, 4-methyl 1-pentene, 1-heptene and 1-octene. The inert diluent is preferably isobutane. The polymerisation or copolymerisation process is typically carried out at a temperature of from 85 to 110° C., more preferably from 90 to 100° C., and at a pressure of from 20 to 42 bar, more preferably at a minimum pressure of 24 bar.

Typically, in the polymerisation process the ethylene monomer comprises from 0.5 to 8% by weight, typically around 6% by weight, of the total weight of the ethylene in the inert diluent. Typically, in the copolymerisation process the ethylene monomer comprises from 0.5 to 8% by weight and the comonomer comprises from 0 to 4% by weight, each based on the total weight of the ethylene monomer and comonomer in the inert diluent.

The mixture of the two chromium-based catalysts is introduced into the polymerisation reactor. The alkylene monomer, and comonomer if present, are fed into the polymerisation reactor and the polymerisation product of HDPE is discharged from the reactor and separated from the diluent which can then be recycled.

The process of the present invention can provide high density polyethylene resins having a low melt index and density typical of high density polyethylenes but with a high degree of bimodality as evidenced by gel phase chromatography of the polyethylene produced by the process of the present invention.

BRIEF DESCRIPTION OF THE DRAWINGS

The present invention will now be described with reference to the following non-limiting Examples and with reference to the following drawings, in which.

Figure 1:
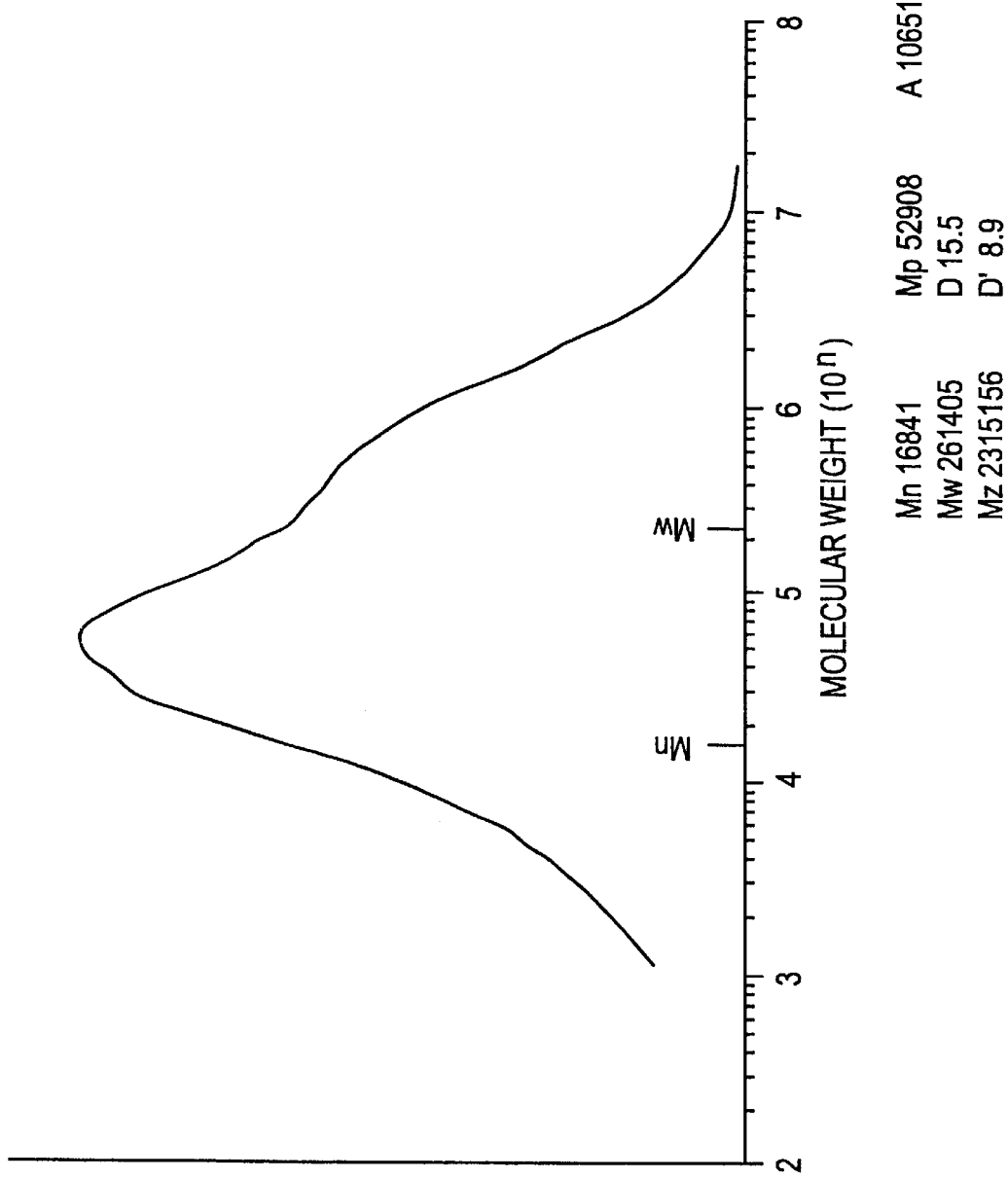
FIGS. 1 to 6 are gel phase chromatography graphs of high density polyethylenes produced in accordance with Examples 1 to 6 respectively of the present invention.

In order to demonstrate the process of the present invention in which a catalyst system of a mixture of two specific chromium-based catalysts was employed, a number of runs to polymerise or copolymerise ethylene to form high density polyethylene were performed. In each of the Examples, a liquid comprising 6 wt % $C_2$ (ethylene), from 0 to 4 wt % $C_6$ (1-hexene) and the balance isobutane as an inert diluent was fed into a polymerisation reaction zone at a pressure of 30 bars and at a polymerisation temperature ranging from 95 to 100° C.

The catalyst system was also fed into the polymerisation reaction zone. In the Examples, the chromium-based catalyst system had been formed by mixing the first chromium-based catalyst which had been subjected to a reduction and then a reoxidation step with a second chromium-based catalyst which had been activated at elevated temperature, fluoridised and then reduced. The proportion by weight of the first and second catalysts in each Example comprised 20 wt % first catalyst and 80 wt % second catalyst.

In each of the Examples, the first chromium-based catalyst consisted of catalyst 1 as discussed hereinabove, had been subjected to an initial carbon monoxide reduction at a relatively high temperature of around 860° C. and a subsequent reoxidation at a temperature of around 760° C. In each of the Examples, the second chromium-based catalyst consisted of catalyst 2 as discussed hereinabove and had been subjected to an initial activation step in which the catalyst was heated in air at a temperature of around 540° C., and a final reduction step in which the catalyst was subjected to carbon monoxide reduction at a relatively low temperature of around 370° C.

The Examples illustrate both polymerisation and copolymerisation of polyethylene. In Examples 1 to 3, no comonomer was present and the polyethylene was produced by polymerisation of ethylene monomer. In Examples 4 to 6, 1-hexene was added in the amounts specified in Table 1 whereby the polyethylene was produced by copolymerisation of the ethylene monomer and the 1-hexene comonomer.

TABLE 1

| Example | Copolymer Amount -wt % | Polymerisation Temperature ° C. | $MI_2$ g/10' | HMLI g/10' | Density g/cc |
|---|---|---|---|---|---|
| 1 | nil | 95 | 0.03 | 6.4 | 0.9539 |
| 2 | nil | 98 | 0.40 | 24.9 | 0.9579 |
| 3 | nil | 100 | 0.59 | 34.9 | 0.9578 |
| 4 | 1 | 95 | 0.08 | 8.9 | 0.9507 |
| 5 | 2 | 95 | 0.11 | 11.8 | 0.9448 |
| 6 | 4 | 95 | 0.27 | 23.7 | 0.9425 |

Table 1 summarizes the conditions employed in Examples 1 to 6 including the comonomer amount and the polymerisation temperature and also indicates the melt index ($MI_2$), the high load melt index (HLMI) and the density of the resultant high density polyethylene products. The melt index $MI_2$ and the high load melt index HLMI were determined using the procedure of ASTM D1238 using respective loads of 2.16 kg and 21.6 kg at a temperature of 190° C. The $MI_2$ and the HLMI are broadly inversely indicative of the molecular weight of the polymer. In other words a low value for the melt index or high load melt index is indicative of a high molecular weight for the polyethylene.

For each Example, the gel phase chromatography yielded not only a graph having a curve representing the molecular weight distribution but also a computation of the average molecular weight by number (Mn); the average molecular weight by weight (Mw); a parameter Mz representing the shape of the tail of the high molecular weight part of the curve; the value of the molecular weight at the peak of the curve (Mp); the dispersion index D representing the ratio Mw/Mn; the dispersion index D' representing the ratio Mz/Mw; and the area A under the curve of the graph. These values are represented in each of the drawings.

Figure 2:
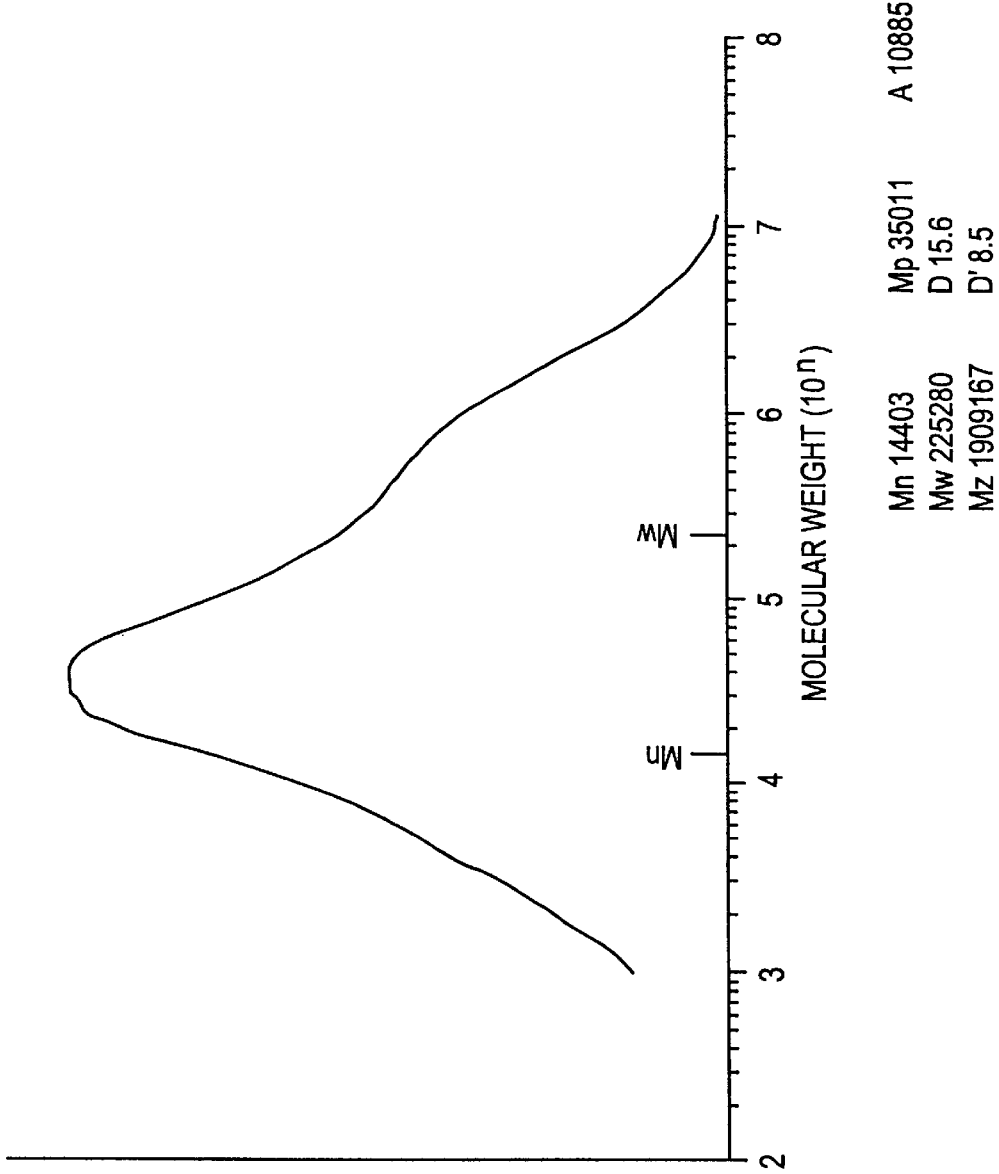
Figure 3:
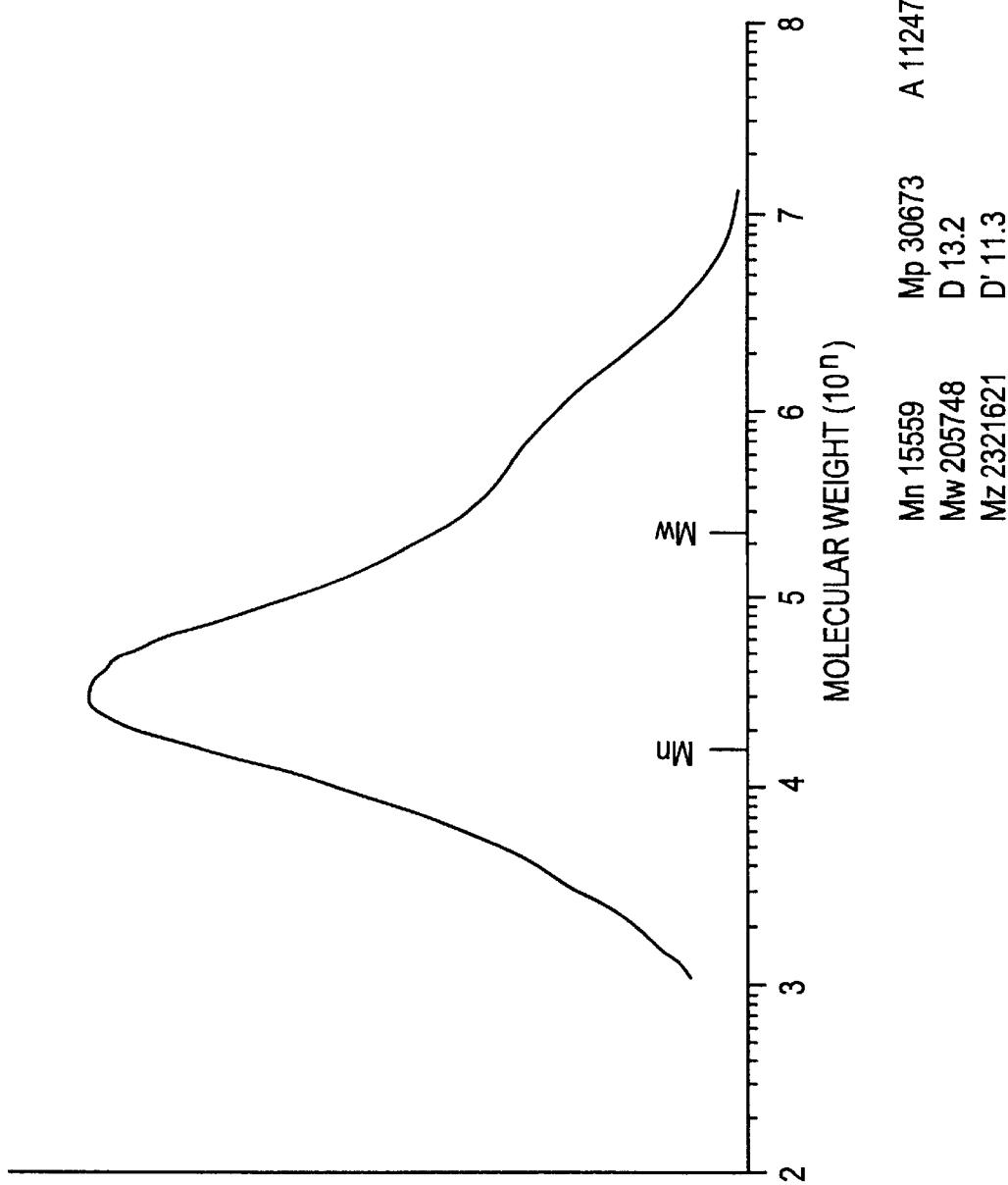
Figure 4:
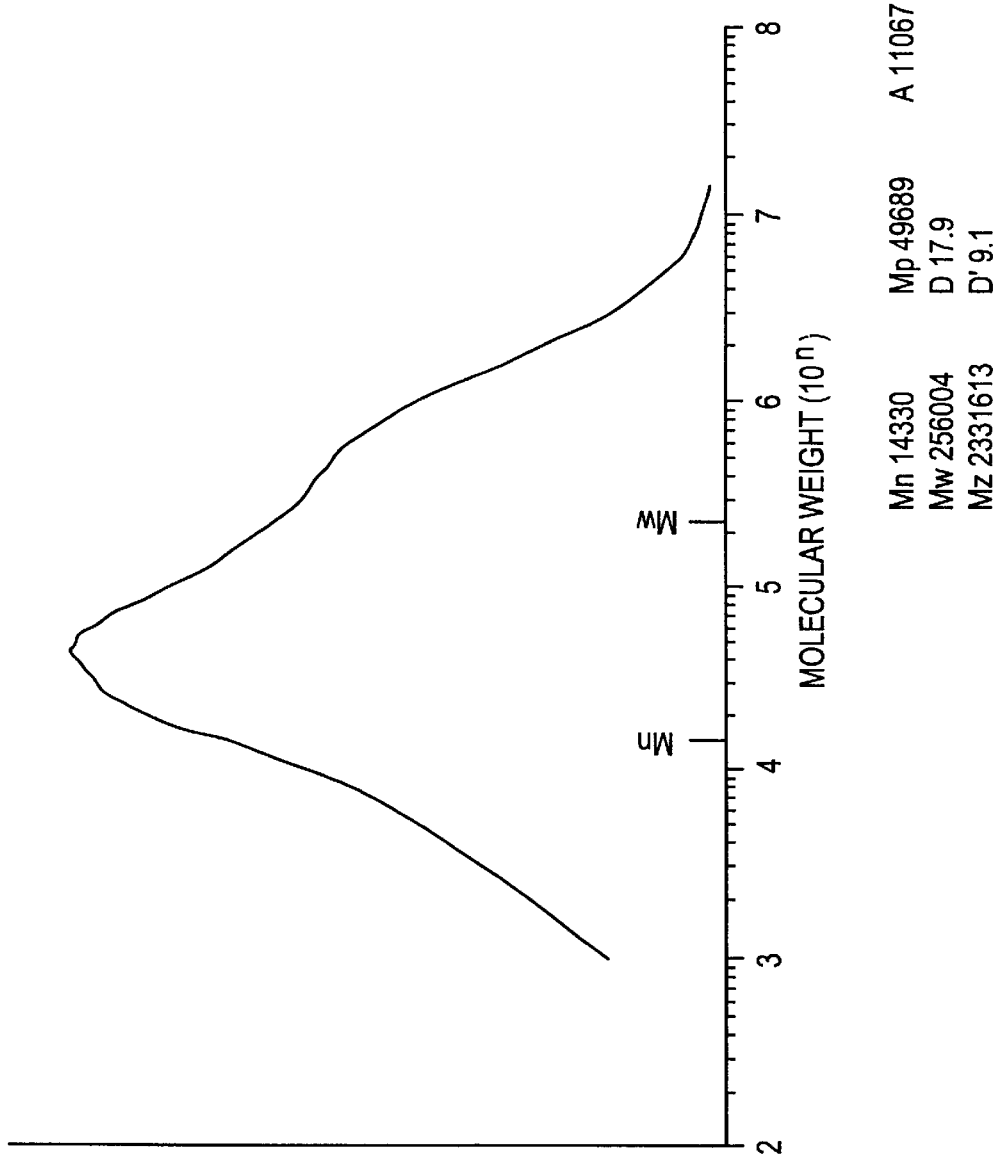
Figure 5:
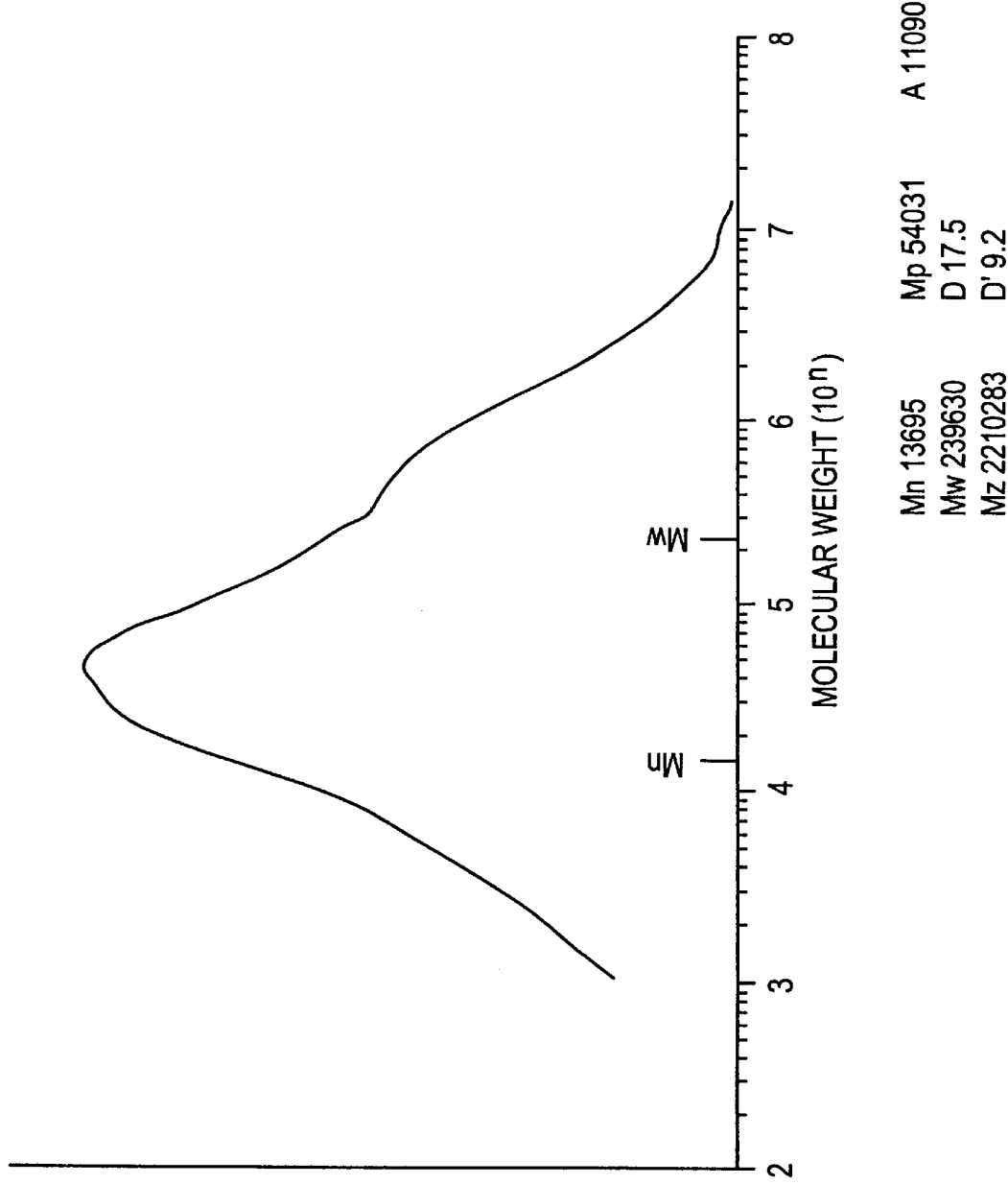
Figure 6:
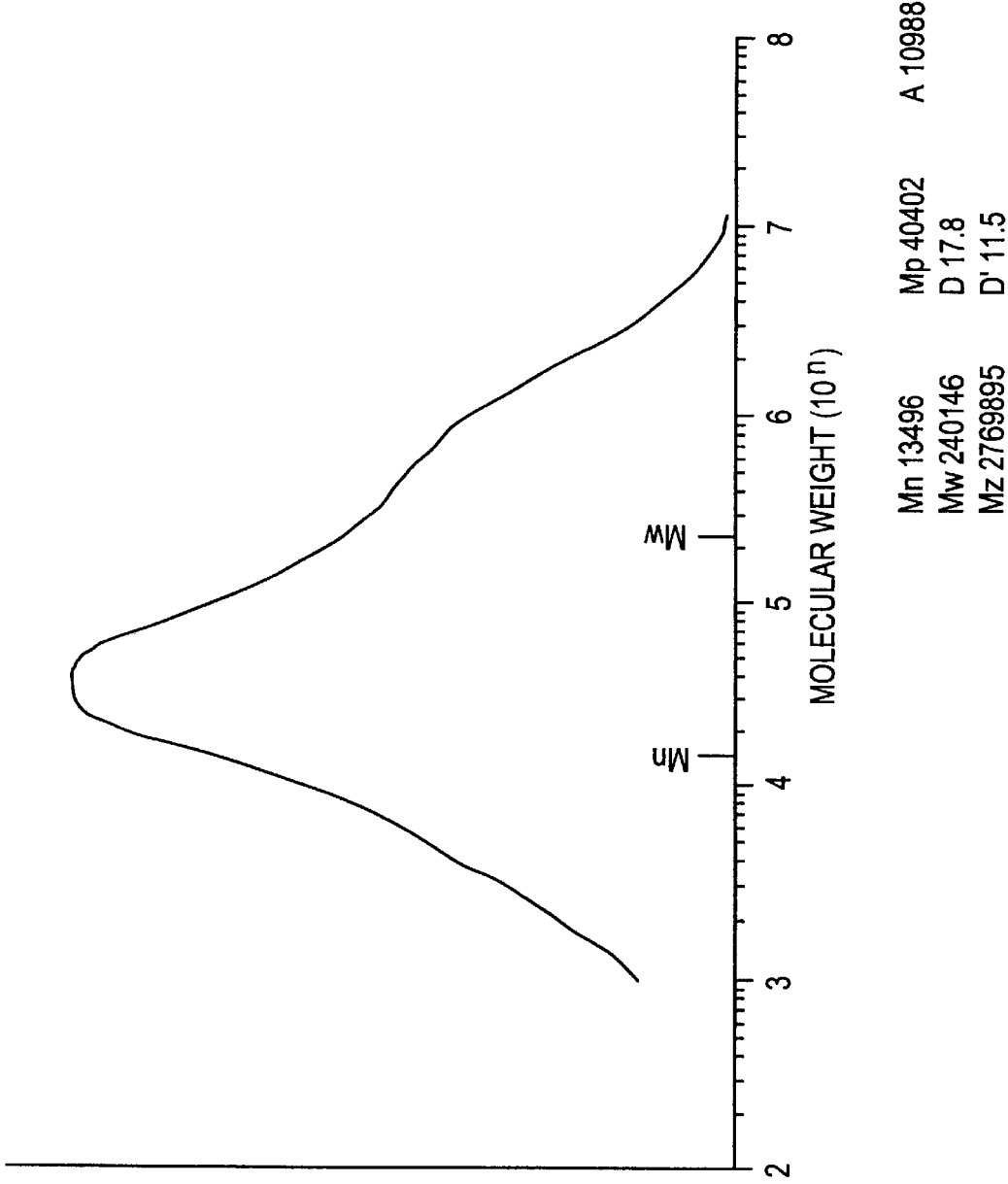

The curves of FIGS. 1 to 6 each show a "shoulder" at the high molecular weight side of the peak of the curve, around the value Mw. Such a shoulder is indicative of a bimodal molecular weight distribution in the high density polyethylene.

What is claimed is:

1. A catalyst system for the production of high density polyethylene by polymerizing ethylene or copolymerizing ethylene and an alpha-olefinic comonomer comprising from 3 to 10 carbon atoms, the catalyst system comprising first and second chromium-based catalysts, the first chromium-based catalyst having been reduced and reoxidized and the second chromium-based catalyst having been activated, fluoridized before or after the activation step, and reduced, the first and second chromium-based catalysts having a pore volume difference of at least 0.8 cc/g and the first chromium-based catalyst having a higher volume porosity than that of the second chromium-based catalyst.

2. A catalyst system according to claim 1 wherein the first chromium-based catalyst comprises chromium oxide on a support comprising silica and/or titania.

3. A catalyst system according to claim 1 wherein the first chromium-based catalyst has a specification surface area of from 300 to 700 $m^2/g$ and a volume porosity of from 2 to 3 cc/g.

4. A catalyst system according to claim 1 wherein the second chromium-based catalyst comprises chromium oxide on a support of a combination of silica and alumina.

5. A catalyst system according to claim 1 wherein the second chromium-based catalyst has a specific surface area of from 250 to 450 $m^2/g$ and a volume porosity of from 0.9 to 1.2 cc/g.

6. A catalyst system according to claim 1 wherein the first and second chromium-based catalysts have a difference in average pore radius of from 50 to 70Å.

* * * * *